US012493117B2

United States Patent
Okunishi et al.

(10) Patent No.: US 12,493,117 B2
(45) Date of Patent: Dec. 9, 2025

(54) CONTROL DEVICE

(71) Applicant: HONDA MOTOR CO., LTD., Tokyo (JP)

(72) Inventors: Shinichi Okunishi, Tokyo (JP); Tatsuya Konishi, Tokyo (JP); Akari Yamashima, Tokyo (JP); Nao Tazawa, Tokyo (JP); Keita Akiho, Tokyo (JP); Takeshi Muraji, Tokyo (JP); Takanori Nishida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 71 days.

(21) Appl. No.: 18/590,988

(22) Filed: Feb. 29, 2024

(65) Prior Publication Data
US 2024/0319362 A1    Sep. 26, 2024

(30) Foreign Application Priority Data
Mar. 24, 2023    (JP) .................................. 2023-048320

(51) Int. Cl.
*G01S 13/86*    (2006.01)
*B60W 60/00*    (2020.01)
(Continued)

(52) U.S. Cl.
CPC .......... *G01S 13/867* (2013.01); *G01S 13/931* (2013.01); *G06T 7/70* (2017.01); *B60W 60/001* (2020.02);
(Continued)

(58) Field of Classification Search
CPC ... G06T 7/13; G06T 7/70; G06T 2207/10028; G06T 2207/10016; G06T 2207/20084;
(Continued)

(56) References Cited

U.S. PATENT DOCUMENTS 10,843,692 B2 *   11/2020   Tohge ..................... G01S 13/42
2018/0357782 A1    12/2018   Nomura
(Continued)

FOREIGN PATENT DOCUMENTS

JP    2008-310585 A    12/2008
JP    2018-206305 A    12/2018
(Continued)

OTHER PUBLICATIONS

Dec. 24, 2024, Japanese Office Action translation issued for related JP Application No. 2023-048320.

*Primary Examiner* — Brandon Z Willis
(74) *Attorney, Agent, or Firm* — Paratus Law Group, PLLC

(57) ABSTRACT

A control device on a vehicle includes is configured to: detect, based on an output from an imaging device, one end and the other end in a left-right direction of the vehicle, in a first end of a detection target object, the first end being on a side close to the vehicle in a front-rear direction of the vehicle, derive, based on the one end and the other end, a first angle between a direction connecting the vehicle and the one end and the front-rear direction and a second angle between a direction connecting the vehicle and the other end and the front-rear direction, derive a first distance between the first end of the detection target object and the vehicle based on radar information, and determine a positional relationship between the vehicle and the detection target object based on the first angle, the second angle, and the first distance.

6 Claims, 7 Drawing Sheets

(51) Int. Cl.
*G01S 13/931* (2020.01)
*G06T 7/70* (2017.01)

(52) U.S. Cl.
CPC . *B60W 2420/403* (2013.01); *B60W 2420/408* (2024.01); *B60W 2552/10* (2020.02); *B60W 2554/4045* (2020.02); *G06T 2207/10028* (2013.01); *G06T 2207/30252* (2013.01)

(58) Field of Classification Search
CPC . G06T 2207/30248; G06T 2207/30252; G06T 2207/30261; G01S 13/06; G01S 13/46; G01S 13/867; G01S 13/931; G01S 2013/468; G06V 20/56; G06V 20/58; B60W 40/00; B60W 50/00; B60W 60/001; B60W 60/0027; B60W 60/00272; B60W 2420/403; B60W 2420/408; B60W 2540/10; B60W 2540/12; B60W 2540/18; B60W 2552/10; B60W 2554/4045; B60W 2554/80; B60W 2554/801; B60W 2556/40; B60W 2754/10; B60W 2754/20; B60W 2754/70; G01C 1/00
See application file for complete search history.

(56) References Cited

U.S. PATENT DOCUMENTS

| | | | |
|---|---|---|---|
| 2019/0113615 A1* | 4/2019 | Takaki | B60W 10/18 |
| 2019/0286926 A1 | 9/2019 | Miura et al. | |
| 2020/0098126 A1* | 3/2020 | Ozawa | G01S 17/931 |
| 2021/0357709 A1 | 11/2021 | Masui et al. | |
| 2023/0286498 A1* | 9/2023 | Oguri | G08G 1/16 |

FOREIGN PATENT DOCUMENTS

| | | |
|---|---|---|
| JP | 2019-156192 A | 9/2019 |
| JP | 2020-122772 A | 8/2020 |
| JP | 2022-081350 A | 5/2022 |

* cited by examiner

CONTROL DEVICE

CROSS-REFERENCE RELATED APPLICATIONS

This application is based on and claims priority under 35 USC 119 from Japanese Patent Application No. 2023-048320 filed on Mar. 24, 2023, the contents of which are incorporated herein by reference.

TECHNICAL FIELD

The present disclosure relates to a control device.

BACKGROUND

In recent years, introduction of automated driving and driving support of vehicles has rapidly progressed.

Japanese Patent Application Laid-Open Publication No. 2019-156192 (hereinafter, referred to as Patent Literature 1) discloses a vehicle control device including an external environment recognition unit that recognizes a surrounding state of a host vehicle; an action planning unit that determines, based on the recognition result of the external environment recognition unit, an action to be performed by the host vehicle; and a vehicle control unit that performs travel control on the host vehicle based on the determination result of the action planning unit.

Examples of a device for recognizing the surrounding state of the host vehicle include an imaging device and a radar device. A detection target object around the host vehicle can be recognized from an image captured by the imaging device, and a positional relationship between the host vehicle and the detection target object can be determined.

In addition, a detection target object around the host vehicle can be recognized from an output of the radar device, and the positional relationship between the host vehicle and the detection target object can be determined. By combining these two determination results, the positional relationship between the host vehicle and the detection target object can be determined with high accuracy.

For example, a lateral distance between the host vehicle and the detection target object may be determined by preferentially using a lateral distance between the host vehicle and the detection target object obtained from the image over a lateral distance between the host vehicle and the detection target object obtained from the output of the radar device. In this case, when an error in the lateral distance between the host vehicle and the detection target object obtained from the image increases, an error in the lateral distance finally determined increases.

An object of the present disclosure is to make it possible to determine a positional relationship between a host vehicle and a detection target object with high accuracy and to improve safety. This further improves traffic safety and contributes to the development of a sustainable transportation system.

SUMMARY

A first aspect of a control device of the present disclosure is a control device that performs travel control on a vehicle. The control device includes: a processor configured to obtain output information of an imaging device and a radar device provided in the vehicle, and the processor is configured to: detect, based on the output information of the imaging device, one end and the other end in a left-right direction of the vehicle, in a first end of a detection target object around the vehicle which is on a side close to the vehicle in a front-rear direction of the vehicle, derive, based on the one end and the other end, a first angle between a direction connecting the vehicle and the one end and the front-rear direction and a second angle between a direction connecting the vehicle and the other end and the front-rear direction, derive a first distance between the first end of the detection target object and the vehicle based on the output information of the radar device, and determine a positional relationship between the vehicle and the detection target object based on the first angle, the second angle, and the first distance.

BRIEF DESCRIPTION OF DRAWINGS

Exemplary embodiment(s) of the present invention will be described in detail based on the following figures, wherein.

DESCRIPTION OF EMBODIMENTS

Figure 1:
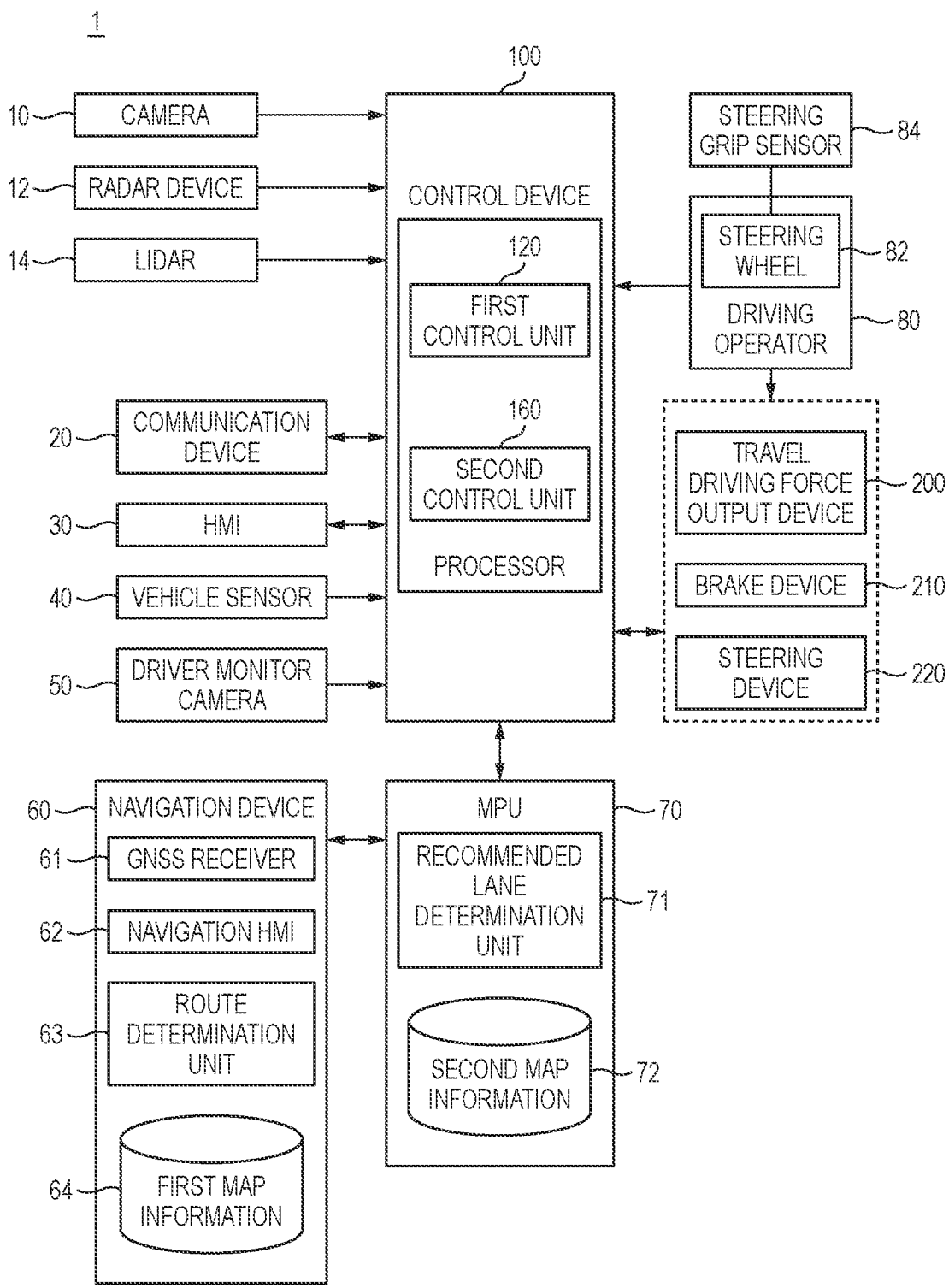
FIG. 1 is a block diagram showing an overall configuration of a vehicle system 1 equipped with a control device 100.

Hereinafter, a vehicle system 1 including a control device 100 according to an embodiment of the present disclosure will be described with reference to the drawings. The drawings are viewed from directions of reference numerals. In the present description, in order to simplify and clarify the description, a front-rear direction, and a left-right direction are described according to directions viewed from a driver of a vehicle M shown in FIG. 2. In the drawings, a front side of the vehicle M is shown as Fr, a rear side is shown as Rr, a left side is shown as L, and a right side is shown as R.

<Overall Configuration of Vehicle System 1>

Figure 2:
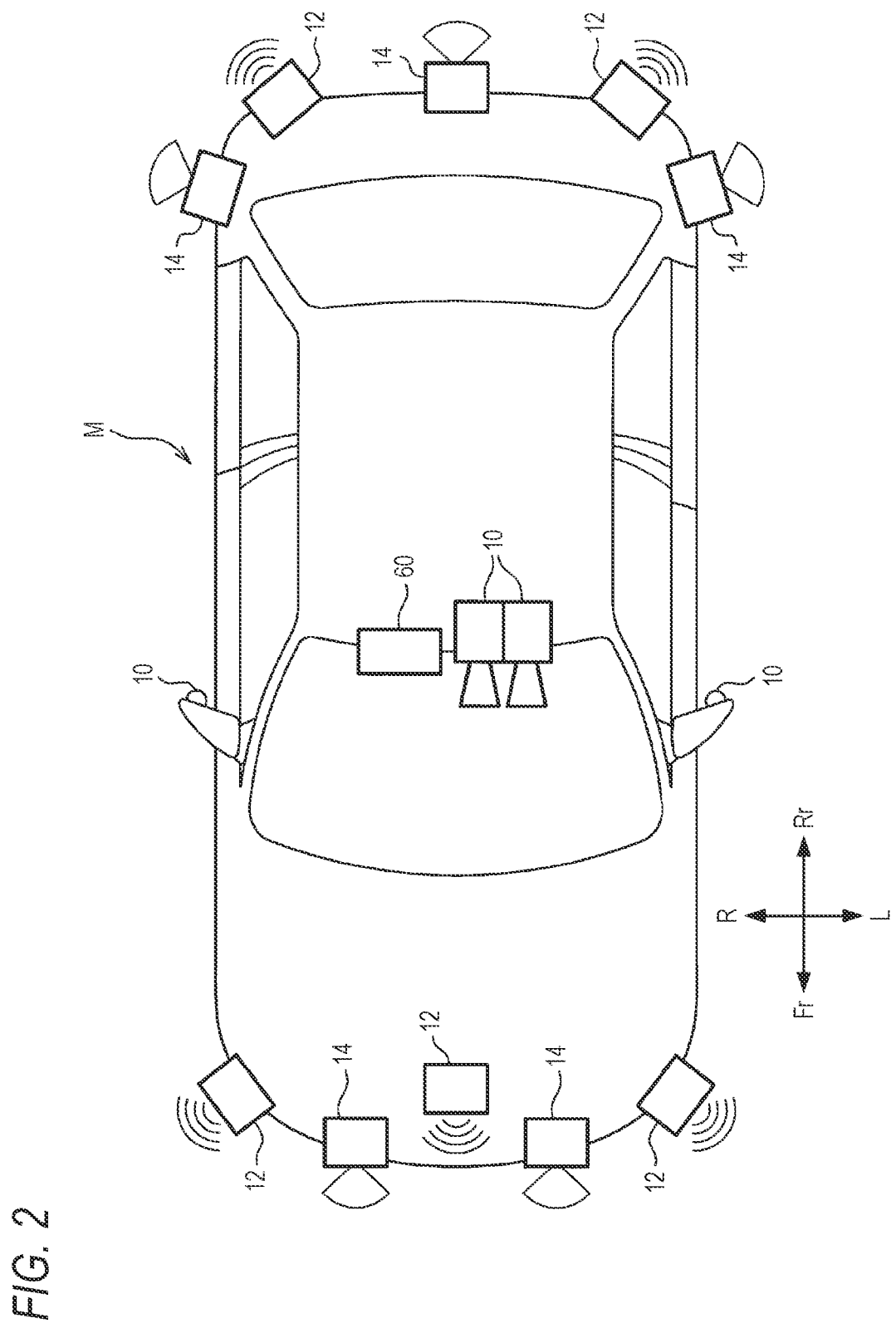
FIG. 2 is a schematic diagram showing an external configuration example of a vehicle M in the vehicle system 1.

FIG. 1 is a block diagram showing an overall configuration of the vehicle system 1 equipped with the control device 100. FIG. 2 is a schematic diagram showing an external configuration example of the vehicle M in the vehicle system 1. The vehicle M is, for example, a vehicle such as a two-wheeled vehicle, a three-wheeled vehicle, or a four-wheeled vehicle, and a drive source thereof is an internal combustion engine such as a diesel engine or a gasoline engine; an electric motor; or a combination thereof. The electric motor operates using electric power generated by an electrical generator coupled to the internal combustion engine or electric power discharged from a secondary battery or a fuel cell. FIG. 2 shows an example in which the vehicle M is a four-wheel vehicle.

The vehicle system 1 includes, for example, a camera 10, a radar device 12, a light detection and ranging (LIDAR) 14, a communication device 20, a human machine interface (HMI) 30, a vehicle sensor 40, a driver monitor camera 50, a navigation device 60, a map positioning unit (MPU) 70, a driving operator 80, a control device 100, a travel driving force output device 200, a brake device 210, and a steering device 220. These devices are connected to each other by a multiplex communication line such as a controller area network (CAN) communication line, a serial communication line, or a wireless communication network.

The camera 10 is, for example, a digital camera using an imaging device such as a charge coupled device (CCD) or a complementary metal oxide semiconductor (CMOS). The camera 10 is attached at any postilion on the vehicle M. For example, as shown in FIG. 2, the camera 10 is provided in the vicinity of a back mirror (not shown) inside a vehicle cabin of the vehicle M, a front portion of a right door and a front portion of a left door outside the vehicle cabin of the vehicle M, and the like. Image information (output information of the cameras 10) on a front side, a right rear side, and a left rear side in a traveling direction of the vehicle M captured by the cameras 10 is transmitted to the control device 100.

The radar device 12 emits radio waves such as millimeter waves to the surroundings of the vehicle M, detects radio waves (reflected waves) reflected by an object, and obtains distribution information (distance and direction of each of a plurality of reflection points) of reflection points of the radio waves reflected by the object. As the radio waves, lasers, microwaves, millimeter waves, ultrasonic waves, or the like can be appropriately used. The radar device 12 is attached at any position on the vehicle M. For example, as shown in FIG. 2, five radar devices 12 are provided, three on the front side and two on the rear side. Output information of the radar device 12 is transmitted to the control device 100. Hereinafter, the output information of the front radar device 12 is referred to as front radar information.

The LIDAR 14 emits light (or an electromagnetic wave having a wavelength close to that of light) to the surroundings of the vehicle M and measures scattered light. The LIDAR 14 detects the presence or absence of an object and a distance to the object based on a time from light emission to light reception. The emitted light is, for example, pulsed laser light. The LIDAR 14 is attached at any postilion on the vehicle M. For example, as shown in FIG. 2, five LIDARs 14 are provided, two on the front side and three on the rear side. Output information of the LIDAR 14 is transmitted to the control device 100.

The communication device 20 uses, for example, a cellular network, a Wi-Fi (registered trademark) network, Bluetooth (registered trademark), or dedicated short range communication (DSRC) to communicate with other vehicles present in the surroundings of the vehicle M or communicate with various server devices via a radio base station.

The HMI 30 presents various types of information to an occupant of the vehicle M and receives an input operation performed by the occupant. The HMI 30 includes various types of display devices, a speaker, a buzzer, a touch panel, a switch, keys, and the like.

The vehicle sensor 40 includes a vehicle speed sensor that detects a speed of the vehicle M, an acceleration sensor that detects an acceleration, a yaw rate sensor that detects an angular velocity around a vertical axis, an azimuth sensor that detects an orientation of the vehicle M, and the like.

The driver monitor camera 50 is, for example, a digital camera using an imaging device such as a CCD image sensor or a CMOS image sensor. The driver monitor camera 50 is attached at any position on the vehicle M in a position and an orientation in which the head of an occupant (hereinafter, also referred to as a "driver") seated in a driver's seat of the vehicle M is able to be imaged from the front (that is, in an orientation in which the face is imaged).

The navigation device 60 includes, for example, a global navigation satellite system (GNSS) receiver 61, a navigation HMI 62, and a route determination unit 63. The navigation device 60 stores first map information 64 in a storage device such as a hard disk drive (HDD) or a flash memory.

The GNSS receiver 61 specifies a position of the vehicle M based on a signal received from a GNSS satellite. The position of the vehicle M may be specified or complemented by an inertial navigation system (INS) using an output of the vehicle sensor 40.

The navigation HMI 62 includes a display device, a speaker, a touch panel, a key, and the like. The navigation HMI 62 may be made common to the HMI 30 partially or entirely.

For example, with reference to the first map information 64, the route determination unit 63 determines a route (hereinafter, also referred to as an "on-map route") from the position of the vehicle M specified by the GNSS receiver 61 (or any position that is received) to a destination input by the occupant using the navigation HMI 62. The first map information 64 is, for example, information in which a road shape is expressed by a link indicating a road and nodes connected by the link. The first map information 64 may include a curvature of a road, point of interest (POI) information, and the like. The on-map route is output to the MPU 70.

The navigation device 60 may perform route guidance using the navigation HMI 62 based on the on-map route. The navigation device 60 may transmit a current position and the destination to a navigation server via the communication device 20 and obtain a route equivalent to the on-map route from the navigation server.

The MPU 70 includes, for example, a recommended lane determination unit 71, and stores second map information 72 in a storage device such as an HDD or a flash memory. The recommended lane determination unit 71 divides the on-map route provided from the navigation device 60 into a plurality of blocks (for example, divides the on-map route by 100 [m] in a vehicle traveling direction), and determines a recommended lane for each block with reference to the second map information 72. The recommended lane determination unit 71 performs, for example, a determination that the vehicle travels in a lane numbered from the left. When a branching point is present in the on-map route, the recommended lane determination unit 71 determines a recommended lane such that the vehicle M may travel along a reasonable route for advancing to a branch destination.

The second map information 72 is map information with higher accuracy than the first map information 64. The second map information 72 includes, for example, information on a center of a lane or information on a boundary of the lane. The second map information 72 may include road information, traffic regulation information, address information, facility information, telephone number information, and the like. The second map information 72 may be updated, as required, by the communication device 20 communicating with another device.

The driving operator 80 includes, for example, an accelerator pedal, a brake pedal, a shift lever, a blinker, and other operators in addition to a steering wheel 82. A sensor that detects an operation amount or the presence or absence of an operation is attached to the driving operator 80, and a detection result thereof is output to some or all of the control device 100, the travel driving force output device 200, the brake device 210, and the steering device 220.

The steering wheel 82 is not necessarily in an annular shape, and may be in the form of irregular steering, joy stick, button, or the like. A steering grip sensor 84 is attached to the steering wheel 82. The steering grip sensor 84 is implemented by a static capacitance sensor or the like, and outputs, to the control device 100, a signal capable of detecting whether the driver is gripping the steering wheel 82.

The control device 100 includes at least a processor such as a central processing unit (CPU), and a storage medium necessary for an operation of the processor. The processor functions as a first control unit 120 and a second control unit 160 by executing the program stored in the storage medium. The control device 100 is not limited to a device in which processing is performed by a single processor, and may be a device in which the processing is shared and performed by a plurality of processors.

<Configuration of First Control Unit 120 and Second Control Unit 160>

Figure 3:
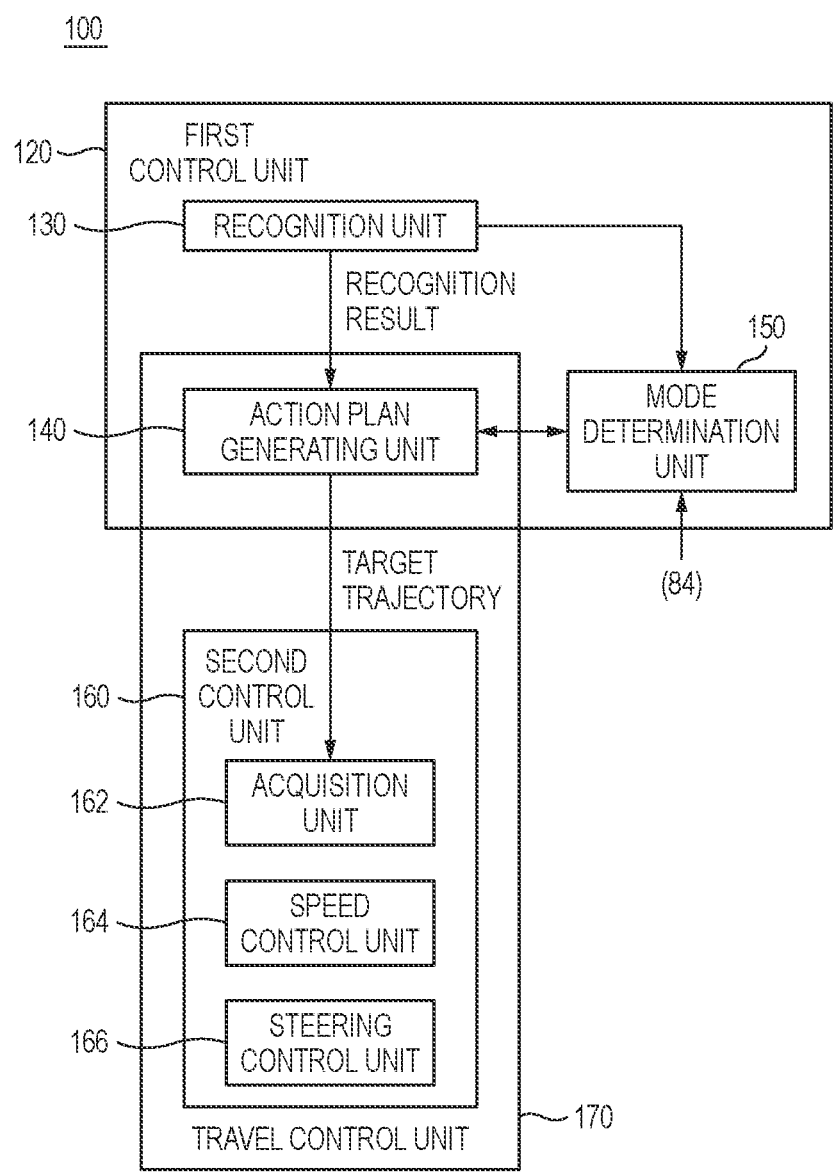
FIG. 3 is a diagram showing an example of a configuration of a first control unit 120 and a second control unit 160.

FIG. 3 is a diagram showing an example of a configuration of the first control unit 120 and the second control unit 160. The first control unit 120 includes, for example, a recognition unit 130, an action plan generating unit 140, and a mode determination unit 150. The first control unit 120 implements, for example, a function based on artificial intelligence (AI) and a function based on a model given in advance in parallel.

For example, a function of "recognizing a crossing point" may be implemented by performing recognition of a crossing point by deep learning or the like and recognition based on a previously given condition (a signal enabling pattern matching, a road marking, or the like) in parallel and performing comprehensive evaluation by scoring the both recognition. Accordingly, the reliability of the automated driving is ensured.

For example, the recognition unit 130 recognizes a travel environment in which the vehicle M is traveling. For example, the recognition unit 130 recognizes a travel lane of the vehicle M by comparing a pattern of road division lines (for example, an array of solid lines and broken lines) obtained from the second map information 72 with a pattern of road division lines around the vehicle M recognized from an image captured by the camera 10. The recognition unit 130 may recognize the travel lane by recognizing not only the road division lines but also a course boundary (road boundary) including a road division line, a road shoulder, a curbstone, a median strip, a guard rail, and the like. In the recognition, the position of the vehicle M obtained from the navigation device 60 or a processing result of the INS may be added. The recognition unit 130 recognizes a temporary stop line, an obstacle, a red signal, a tollgate, and other road events.

For example, when recognizing a travel lane, the recognition unit 130 recognizes a position and a posture of the vehicle M with respect to the travel lane. For example, the recognition unit 130 may recognize a deviation of a reference point of the vehicle M from a lane center and an angle of a traveling direction of the vehicle M with respect to a line connecting lane centers, as the relative position and the posture of the vehicle M with respect to the travel lane. Alternatively, the recognition unit 130 may recognize a position of the reference point of the vehicle M with respect to any side end portion (road division line or road boundary) of the travel lane as the relative position of the vehicle M with respect to the travel lane. Hereinafter, as an example, an installation position of the camera 10 is set as a reference point P.

The recognition unit 130 recognizes the surrounding environment of the vehicle M based on some or all of the output information of the camera 10, the radar device 12, and the LIDAR 14. For example, the recognition unit 130 recognizes a position of an object around the vehicle M, a type of the object (moving object or stationary object), and the like. The position of the object is recognized as, for example, a position on absolute coordinates (an XY plane indicated by a Y axis (Y axis Ay in FIG. 6) passing through a representative point (a center of gravity, a drive shaft center, or the like) of the vehicle M and parallel to the left-right direction and an X axis (X axis Ax in FIG. 6) passing through the representative point of the vehicle M and parallel to the front-rear direction) with the representative point of the vehicle M as an origin, and is used for various controls.

Examples of the object around the vehicle M include a moving object (another vehicle traveling around the vehicle M), a stationary object (an object forming a boundary of a road such as a plant, a wall, or a median strip), and an installation object (a cone, a guard rail, a signboard, a temporary traffic light, and the like) specific to a construction or an accident. The recognition unit 130 performs, as recognition processing for a moving object around the vehicle M, first processing of recognizing a moving object based on the output of the radar device 12 and second processing of recognizing a moving object based on the output information of the camera 10.

The action plan generating unit 140 generates a target trajectory in which the vehicle M travels in principle in the recommended lane determined by the recommended lane determination unit 71, and further automatedly travels in the future (regardless of an operation of the driver) so as to correspond to a surrounding situation of the vehicle M. The target trajectory includes, for example, a velocity element. For example, the target trajectory is represented by arranging points (trajectory points) to be reached by the vehicle M in order. The trajectory point is a point to be reached by the vehicle M for each predetermined travel distance (for example, about several meters) in a road distance, and separately, a target speed and a target acceleration for each predetermined sampling time (for example, about a few fractions of a second) are generated as a part of the target trajectory. The trajectory point may be a position to be reached by the vehicle M within a sampling time at each predetermined sampling time point. In this case, information on the target speed and the target acceleration is expressed by an interval of the trajectory points.

The action plan generating unit 140 may set an event of automated driving when generating the target trajectory. The event of the automated driving includes a constant speed traveling event, a low speed following traveling event, a lane change event, a branching event, a merging event, a take over event, and the like. The action plan generating unit 140 generates the target trajectory according to an activated event.

The mode determination unit 150 determines a driving mode of the vehicle M to be any one of a plurality of driving modes in which tasks imposed on the driver are different. In a case where a task of the determined driving mode (hereinafter, referred to as a current driving mode) is not executed by the driver, the mode determination unit 150 changes the driving mode of the vehicle M to a driving mode in which the task is heavier. The mode determination unit 150 is an example of a control state setting unit that selects and sets, from a plurality of driving modes, a mode in which control on at least one of the travel speed and the steering of the vehicle M is automated.

<Specific Example of Driving Mode>

Figure 4:
FIG. 4 is a diagram showing specific examples of a driving mode.

FIG. 4 is a diagram showing specific examples of the driving mode. The vehicle M has, for example, five driving modes including a first driving mode to a fifth driving mode. A degree of automation of the control state, that is, the driving control on the vehicle M is highest in the first driving mode, decreases in the order of the second driving mode, the third driving mode, and the fourth driving mode, and is lowest in the fifth driving mode. In contrast, the task imposed on the driver is easiest in the first driving mode, gets heavier in the order of the second driving mode, the third driving mode, and the fourth driving mode, and is heaviest in the fifth driving mode. In the driving modes other than the first driving mode, since the control state is not automated driving, the control device 100 is responsible for ending control on the automated driving and shifting to driving support or manual driving. Hereinafter, contents of each driving mode will be exemplified.

In the first driving mode, the vehicle is in an automated driving state, and neither forward monitoring nor gripping of the steering wheel 82 is imposed on the driver. However, even in the first driving mode, the driver is required to be in a posture capable of quickly shifting to the manual driving in response to a request from the control device 100. Here, the automated driving means that both steering and acceleration/deceleration are controlled regardless of the operation of the driver. The front means a space in the traveling direction of the vehicle M viewed through a windshield. The first driving mode is, for example, a driving mode that can be executed in a case where a condition is satisfied such as the vehicle M is traveling at a predetermined speed or less (for example, about 60 [km/h]) on an automobile dedicated road such as an expressway and there is a preceding vehicle to be followed.

In the second driving mode, the vehicle is in a driving support state, and a task of monitoring the front of the vehicle M (hereinafter referred to as front monitoring) is imposed on the driver, but a task of gripping the steering wheel 82 is not imposed on the driver. In the third driving mode, the vehicle is in a driving support state, and a task of forward monitoring and a task of gripping the steering wheel 82 are imposed on the driver. The fourth driving mode is a driving mode in which the driver is required to perform a driving operation of a certain degree in relation to at least one of steering and acceleration/deceleration of the vehicle M. For example, in the fourth driving mode, driving support such as adaptive cruise control (ACC) or lane keeping assist system (LKAS) is performed. In the fifth driving mode, the vehicle is in a manual driving state in which steering and acceleration/deceleration require driving operation of the driver. In both the fourth driving mode and the fifth driving mode, a task of monitoring the front of the vehicle M is naturally imposed on the driver.

With reference to FIG. 3 again, the second control unit 160 controls the vehicle M to pass through, at a scheduled time, the target trajectory generated by the action plan generating unit 140. The second control unit 160 includes, for example, an acquisition unit 162, a speed control unit 164, and a steering control unit 166.

The acquisition unit 162 obtains information on the target trajectory (trajectory points) generated by the action plan generating unit 140 and stores the information in a memory (not shown). The speed control unit 164 controls the travel driving force output device 200 (see FIG. 1) or the brake device 210 (see FIG. 1) based on the speed element accompanying the target trajectory stored in the memory. The steering control unit 166 controls the steering device 220 (see FIG. 1) according to a degree of curvature of the target trajectory stored in the memory. The processing of the speed control unit 164 and the steering control unit 166 is implemented by, for example, a combination of feedforward control and feedback control.

In the control device 100, a combination of the action plan generating unit 140 and the second control unit 160 constitutes the travel control unit 170. The travel control unit 170 executes control of automatic lane change in the vehicle M based on the recognition result for the travel environment or the surrounding environment of the vehicle M recognized by the recognition unit 130. Further, the travel control unit 170 detects, based on an operation of the driver on the driving operator 80 (for example, a turn signal lever), a lane change intention of the driver.

The travel control unit 170 selects one lane change mode from a plurality of lane change modes different in degrees of participation of the driver of the vehicle M, and performs travel control (also referred to as lane change control) according to the selected lane change mode. The plurality of lane change modes different in degrees of participation of the driver of the vehicle M may be referred to as a plurality of lane change modes different in degrees of automation. The degree of automation increases as the degree of participation of the driver decreases, and the degree of automation decreases as the degree of participation of the driver increases.

For example, the plurality of lane change modes may include the following three automatic lane change modes. A first automatic lane change is an intended automatic lane change (ALC-category C) in which the driver of the vehicle M intends to change the lane and the driver of the vehicle M instructs to start the lane change. In the intended automatic lane change, the driver of the vehicle M determines whether to perform the lane change in consideration of a travel state of other vehicles, a route to the destination, and the like. When determining to perform the lane change, the driver of the vehicle M gives an instruction to start the lane change to the vehicle M by operating the driving operator 80. Based on the instruction, the travel control unit 170 starts the automatic lane change at an executable timing while considering the surrounding travel state.

A second automatic lane change is a proposed automatic lane change (ALC-category D) in which the travel control unit 170 proposes the lane change and the driver of the vehicle M approves the lane change. In the proposed automatic lane change, the travel control unit 170 determines, based on the travel state of other vehicles, the route to the destination, and the like, whether to perform the lane change. When determining to perform the lane change, the travel control unit 170 proposes the lane change to the driver. When approving the proposal of the lane change, the driver of the vehicle M operates an approval switch to give the vehicle M an instruction to start the lane change. The approval switch may be a switch dedicated to approval, or may be an operator (for example, the driving operator 80) having another function. Based on the instruction, the travel control unit 170 starts the automatic lane change at an executable timing while considering the surrounding travel state. Accordingly, when the driver does not approve the proposal of the lane change, that is, when the driving operator 80 is not operated, the automatic lane change is not executed.

A third automatic lane change is a determined automatic lane change (ALC-category E) in which the travel control unit 170 determines the lane change and the travel control unit 170 determines the start of the lane change. In the determined automatic lane change, the travel control unit 170 determines, based on the travel state of other vehicles, the route to the destination, and the like, whether to perform the lane change. When determining to perform the lane change, the travel control unit 170 starts the automatic lane change at an executable timing in consideration of the surrounding travel state. In the case of the determined automatic lane change, the driver of the vehicle M is not involved in the lane change.

The control device 100 executes the automatic lane change corresponding to the driving mode. For example, the control device 100 may execute the determined automatic lane change in the first driving mode. The control device 100 may execute the proposed automatic lane change in the second driving mode, the third driving mode, and the fourth driving mode. The control device 100 may execute the intended automatic lane change in the third driving mode and the fourth driving mode. In the fifth driving mode, the control device 100 does not execute any automatic lane change.

With reference to FIG. 1 again, the travel driving force output device 200 outputs, to driving wheels, a travel driving force (torque) for driving the vehicle to travel. The travel driving force output device 200 includes, for example, a combination of an internal combustion engine, an electric motor, a transmission, and the like, and an electronic control unit (ECU) that controls the combination. The ECU controls the above-described configuration according to information received from the second control unit 160 or information received from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information received from the second control unit 160 or information received from the driving operator 80, and outputs a braking torque to each wheel in response to a braking operation.

The steering device 220 includes, for example, a steering ECU and an electric motor. The electric motor changes an orientation of driven wheels, for example, by applying a force to a rack-and-pinion mechanism. The steering ECU drives the electric motor according to information received from the second control unit 160 or information received from the driving operator 80 to change the orientation of the driven wheels.

<Determination of Positional Relationship with Detection Target Object>

Figure 5:
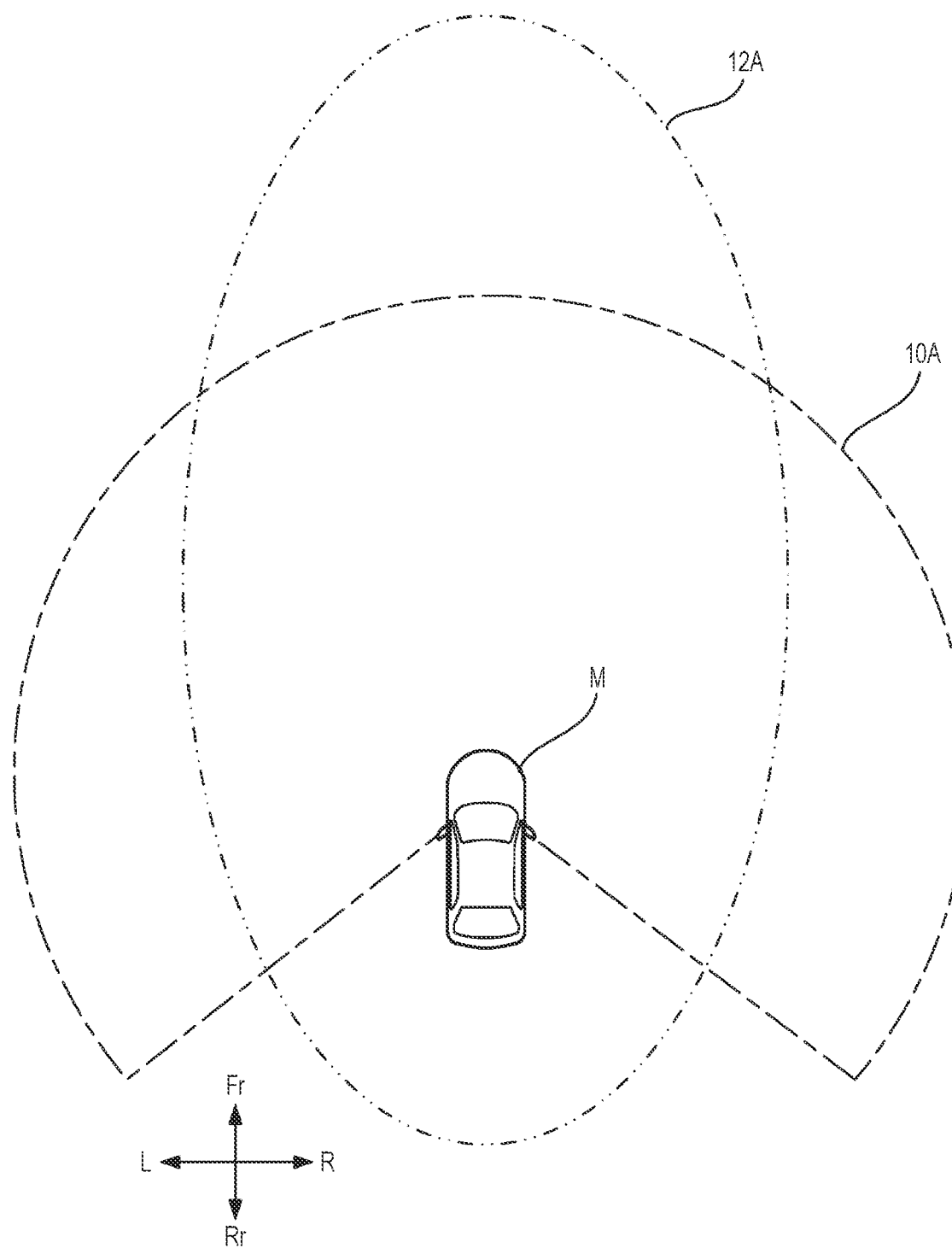
FIG. 5 is a diagram schematically showing a region around the vehicle M which can be recognized by a recognition unit 130.

FIG. 5 is a diagram schematically showing a region around the vehicle M which can be recognized by a recognition unit 130. FIG. 5 shows a range 10A in which an object can be detected by the cameras 10 and a range 12A in which an object can be detected by the radar devices 12. As shown in FIG. 5, the radar devices 12 have a wide detection range in the front-rear direction, and the cameras 10 have a wide detection range in the left-right direction. Accordingly, a distance in the front-rear direction between the vehicle M and another vehicle as the detection target object around the vehicle M may be derived more accurately by using the output information of the radar devices 12 than by using the output information of the cameras 10. A distance in the left-right direction between the vehicle M and another vehicle may be derived more accurately by using the output information of the cameras 10 than by using the output information of the radar devices 12.

Figure 6:
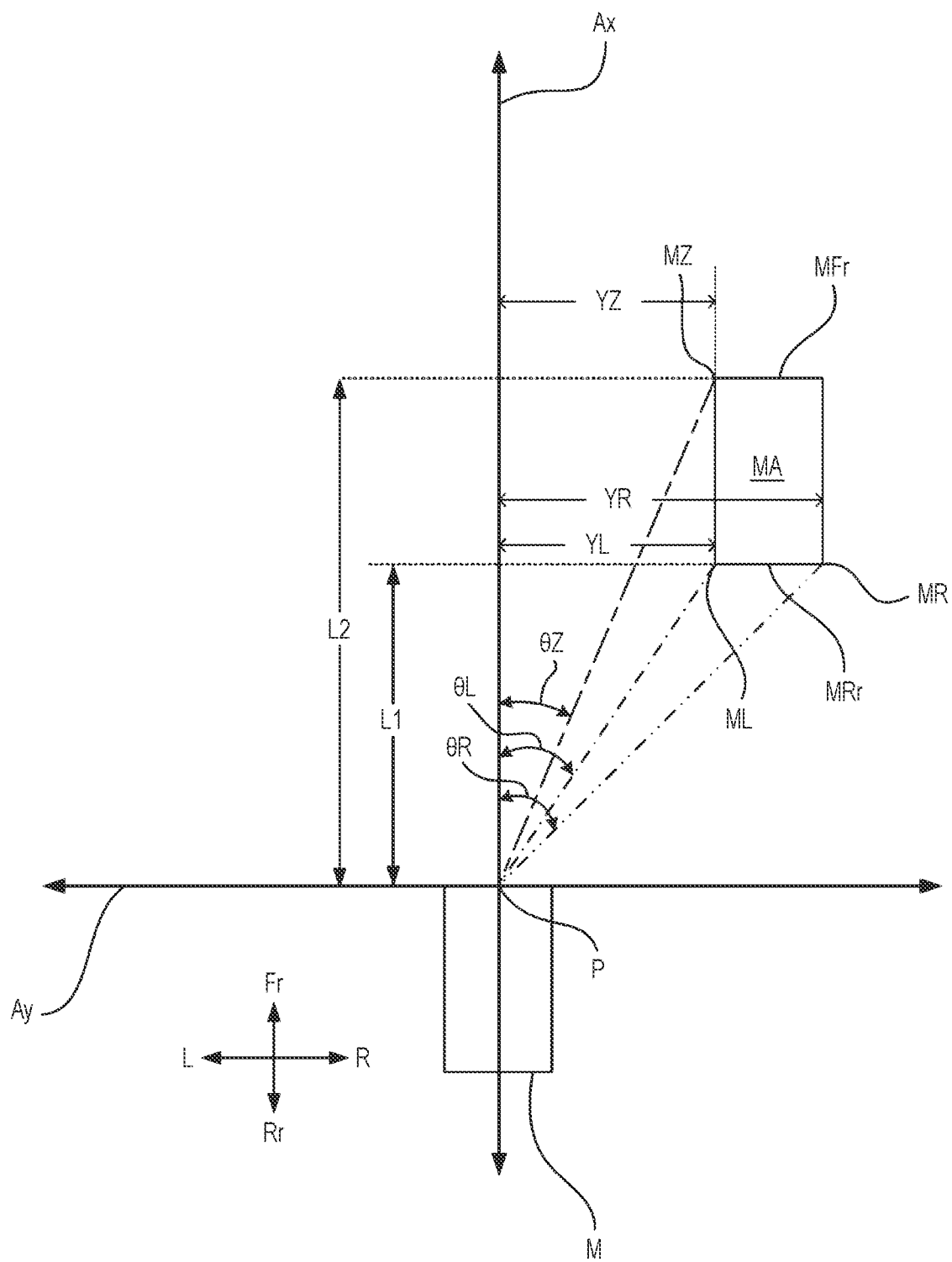
FIG. 6 is a schematic diagram illustrating a method of determining a positional relationship between the vehicle M and another vehicle MA.

FIG. 6 is a schematic diagram showing a method of determining a positional relationship between the vehicle M and another vehicle MA. FIG. 6 shows a state in which the common other vehicle MA is recognized based on the image information from the cameras 10 and the front radar information from the front radar devices 12.

As feature points of the other vehicle MA recognized based on the image information, the first control unit 120 detects one end (a right rear end MR in the example of FIG. 6) and the other end (a left rear end ML in the example of FIG. 6) in the left-right direction, in a first end (a rear end MRr in the example of FIG. 6) on a side close to the vehicle M in the front-rear direction. As feature points of the other vehicle MA, the first control unit 120 detects a specific end (a left front end MZ in the example of FIG. 6) on a side close to the vehicle M in the left-right direction, in a second end (a front end MFr in the example of FIG. 6) on a side far from the vehicle M in the front-rear direction.

The first control unit 120 derives a first angle θR formed between a direction connecting the vehicle M and the right rear end MR and the front-rear direction (an angle formed by a straight line passing through the reference point P and extending in the front-rear direction and a straight line connecting the reference point P and the right rear end MR) based on the right rear end MR detected based on the image information. The first control unit 120 derives a second angle θL formed between a direction connecting the vehicle M and the left rear end ML and the front-rear direction (an angle formed by a straight line passing through the reference point P and extending in the front-rear direction and a straight line connecting the reference point P and the left rear end ML) based on the left rear end MR detected based on the image information. The first control unit 120 derives a third angle Z formed between a direction connecting the vehicle M and the left front end MZ and the front-rear direction (an angle formed by a straight line passing through the reference point P and extending in the front-rear direction and a straight line connecting the reference point P and the left front end MZ) based on the left front end MR detected based on front image information.

The first control unit 120 obtains distance information between the other vehicle MA and the vehicle M in the front-rear direction based on the front radar information. The first control unit 120 obtains, as the distance information, a first distance L1 from the reference point P to the rear end MRr and a second distance L2 from the reference point P to the front end MFr.

The first control unit 120 derives distance information between the vehicle M and the other vehicle MA in the left-right direction (a distance YR to a right end of the other vehicle MA and a distance YL to a left end of the other vehicle MA) by performing calculations of the following formulas (A) and (B) using various types of information derived in this way. By using the distance information derived in this way, it can be determined whether the other vehicle MA is traveling in a lane adjacent to the lane in which the vehicle M is traveling, whether the other vehicle MA is traveling in a lane further adjacent to the adjacent lane, and the like, and travel control using the determination can be performed. Tan represents tangent.

$$YR = L1 \times \tan \theta R \tag{A}$$

$$YL = L1 \times \tan \theta L \tag{B}$$

The first control unit 120 further calculates the following equation (C) to derive a distance YZ from the vehicle M to a right front end of the other vehicle MA.

$$YZ = L2 \times \tan\theta Z \quad (C)$$

The first control unit 120 derives an angle formed between a traveling direction of the other vehicle MA and a traveling direction (synonymous with the front-rear direction) of the vehicle M based on the derived distance YZ and distance YL. For example, it is assumed that the angle is 0 degree when the distance YZ and the distance YL are the same, the angle increases in a positive direction as the distance YZ decreases when the distance YZ<the distance YL, and the angle increases in a negative direction as the distance YZ increases when the distance YZ>the distance YL.

For example, in a case where it is recognized that the other vehicle MA is traveling in the adjacent lane based on the distance YR and the distance YL, the first control unit 120 further determines, using the angle described above, whether the other vehicle MA is to enter the lane in which the vehicle M is traveling from the adjacent lane. For example, when the angle is equal to or greater than a threshold greater than 0, it is determined that the other vehicle MA is to enter in front of the vehicle M, and when the angle is less than the threshold, it is determined that the other vehicle MA is not to enter in front of the vehicle M. In this way, by performing the entering determination of the other vehicle MA, for example, when it is determined that the other vehicle MA enters, travel control such as reducing the speed to maintain an inter-vehicle distance can be performed.

Figure 7:
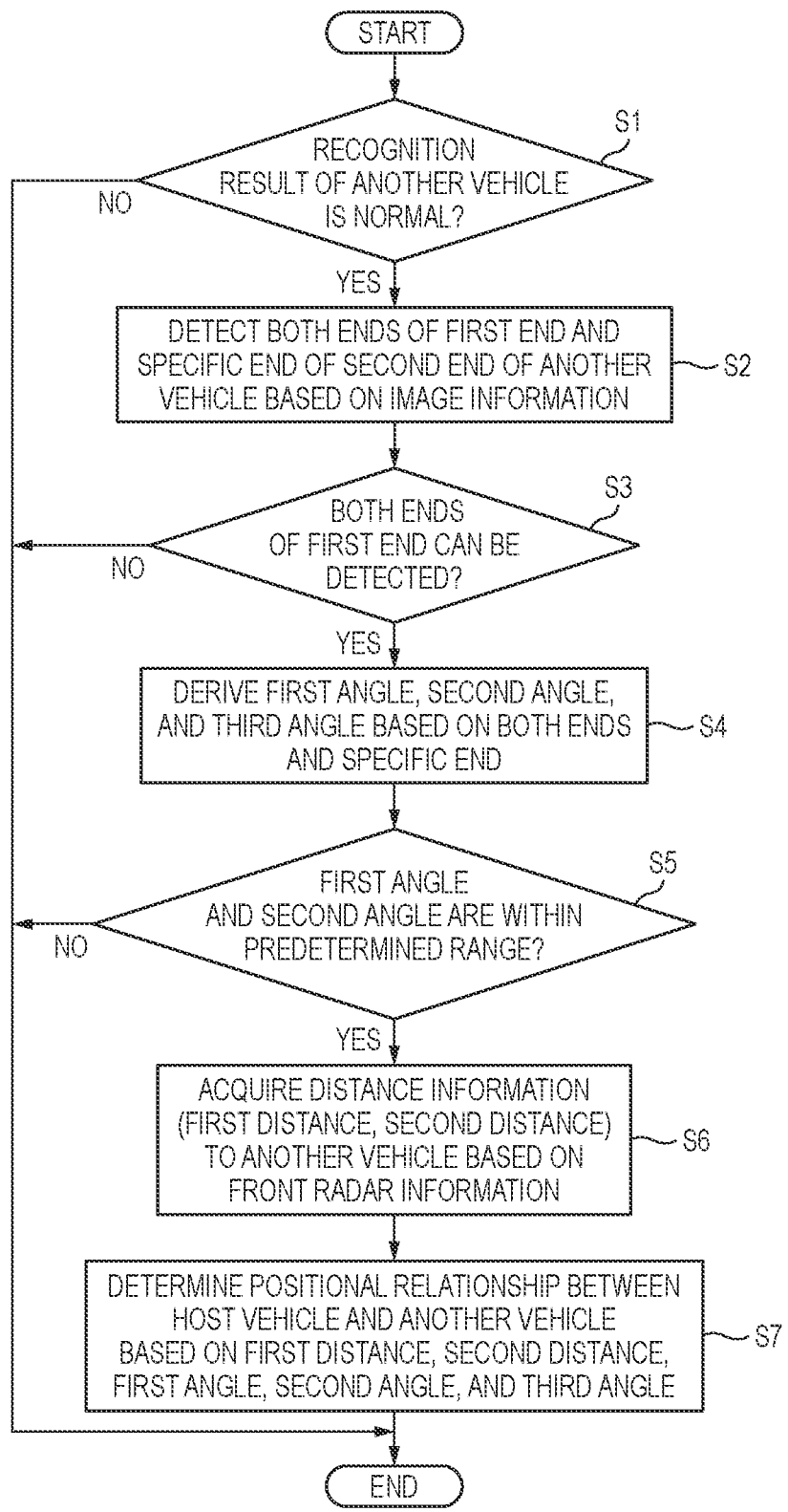
FIG. 7 is a flowchart illustrating an operation of the first control unit 120 when determining a positional relationship between a vehicle and another vehicle.

FIG. 7 is a flowchart illustrating processing of the first control unit 120 when determining a positional relationship between a vehicle and another vehicle. The flowchart shows the operation when the other vehicle MA is recognized based on the image information and the front radar information.

The first control unit 120 determines whether the recognition result of the other vehicle MA recognized based on the image information is normal (step S1). For example, the first control unit 120 determines that the recognition result is abnormal when a movement speed of the other vehicle MA exceeds a threshold, or a width of the other vehicle MA in the left-right direction exceeds a threshold.

When it is determined that the recognition result is abnormal (step S1: NO), the first control unit 120 ends the processing. When it is determined that the recognition result is normal (step S1: YES), the first control unit 120 detects both ends (the right rear end MR and the left rear end ML in FIG. 6) of the first end of the other vehicle MA and the specific end (the left front end MZ in FIG. 6) of the second end of the other vehicle MA based on the image information (step S2).

Next, the first control unit 120 determines whether the both ends of the first end can be detected in step S2 (step S3). In an image of the other vehicle MA contained in the image information, for example, the left rear end or the right rear end of the other vehicle MA may be invisible due to sunlight or an obstacle, and in such a case, the left rear end or the right rear end of the other vehicle MA cannot be detected. In such a case, the determination in step S3 is NO. When the determination in step S3 is NO (at least one of the both ends is not detectable), the processing is ended.

When the both ends of the first end cannot be detected (step S3: YES), the first control unit 120 derives the first angle $\theta R$, the second angle $\theta L$, and the third angle $\theta Z$ based on the both ends of the first end and the specific end of the second end (step S4).

Next, the first control unit 120 determines whether each of the first angle $\theta R$ and the second angle $\theta L$ derived in step S4 is within a predetermined range (step S5). The predetermined range is determined in advance as a range assumed when there is another vehicle traveling in a lane adjacent to or further adjacent to the lane in which the vehicle M travels. Accordingly, when at least one of the first angle $\theta R$ and the second angle $\theta L$ exceeds the predetermined range, the first control unit 120 determines that the reliability of at least one of the first angle $\theta R$ and the second angle $\theta L$ is low due to some abnormality, and stops the determination of the positional relationship using the angles. That is, when at least one of the first angle $\theta R$ and the second angle $\theta L$ exceeds the predetermined range (step S5: NO), the first control unit 120 ends the processing.

In a case where each of the first angle $\theta R$ and the second angle $\theta L$ is within the predetermined range (step S5: YES), the first control unit 120 obtains distance information (the first distance L1 and the second distance L2 in FIG. 6) between the other vehicle MA and the vehicle M in the front-rear direction based on the front radar information (step S6).

Then, the first control unit 120 determines the positional relationship between the vehicle M and the other vehicle MA as described above based on the distance information obtained in step S6 and the angle information derived in step S4 (step S7). Thereafter, the travel control unit 170 performs travel control on the vehicle M based on the determined positional relationship.

The first distance L1 and the second distance L2 shown in FIG. 6 can also be derived based on the image information. For example, a distance to the other vehicle MA in the front-rear direction can be estimated based on a position of the other vehicle MA in the upper-lower direction in a captured image. However, when a road on which the vehicle M and the other vehicle MA are traveling has a gradient, the distance to the other vehicle MA in the front-rear direction that can be estimated from the captured image may include an error. Meanwhile, the distance to the other vehicle MA recognized based on the radar device 12 can be obtained with high accuracy even if the road has a gradient. In the present embodiment, the first control unit 120 derives the distance YL and the distance YR based on the angle information (the first angle $\theta R$ and the second angle $\theta L$) derived based on the image information and the distance information (the first distance L1) derived based on the front radar information. Since the information on the distance is not directly obtained from the image information, the distance YL and the distance YR can be derived with high accuracy even if the road has a gradient.

In the present embodiment, the first control unit 120 can derive the distance YZ based on the angle information (the third angle $\theta Z$) derived based on the image information and the distance information (the second distance L2) derived based on the front radar information, and can derive an entering angle of the other vehicle MA by comparing the distance YZ and the distance YL. Since the distance information is not directly obtained from the image information, the distance YZ can also be derived with high accuracy even if the road has a gradient. As a result, the entering angle can also be derived with high accuracy, and the reliability of the travel control can be improved.

In the present embodiment, the first control unit 120 performs the determination of step S7 only when the first angle θR and the second angle θL are within the predetermined range. Accordingly, the positional relationship with the other vehicle can be determined with higher accuracy.

In the present embodiment, when at least one of the left rear end and the right rear end of the other vehicle MA cannot be detected, the first control unit 120 does not perform the determination of step S7. Accordingly, the positional relationship with the other vehicle can be determined with higher accuracy.

In the present specification, at least the following matters are described. Although corresponding constituent elements or the like in the above-described embodiments are shown in parentheses, the present disclosure is not limited thereto.

(1) A control device (control device 100) that performs travel control on a vehicle (vehicle M), includes:
- a processor configured to obtain output information of an imaging device (camera 10) and a radar device (radar device 12) provided in the vehicle, and
- the processor is configured to:
  - detect, based on the output information of the imaging device, one end (right rear end MR) and the other end (left rear end ML) in a left-right direction of the vehicle, in a first end (rear end MRr) of a detection target object (another vehicle MA) around the vehicle, the first end being on a side close to the vehicle in a front-rear direction of the vehicle,
  - derive, based on the one end and the other end, a first angle (first angle θR) between a direction connecting the vehicle and the one end and the front-rear direction and a second angle (second angle θL) between a direction connecting the vehicle and the other end and the front-rear direction,
  - derive a first distance (first distance L1) between the first end of the detection target object and the vehicle based on the output information of the radar device, and
  - determine a positional relationship between the vehicle and the detection target object based on the first angle, the second angle, and the first distance.

According to (1), since the positional relationship with the detection target object can be determined with high accuracy, the safety of travel control can be improved.

(2) In the control device described in (1),
the processor is configured to:
- detect, based on the output information of the imaging device, a specific end (left front end MZ) that is an end on a side close to the vehicle in the left-right direction, in a second end (front end MFr) of the detection target object, the second end being on a side far from the vehicle in the front-rear direction,
- derive a third angle (third angle θZ) between a direction connecting the vehicle and the specific end and the front-rear direction based on the specific end,
- derive a second distance (second distance L2) between the second end of the detection target object and the vehicle based on the output information of the radar device, and
- determine the positional relationship based on the first angle, the second angle, the first distance, the third angle, and the second distance.

According to (2), the positional relationship with the detection target object can be determined with higher accuracy.

(3) In the control device described in (2),
the processor is configured to determine an angle between a traveling direction of the detection target object and a traveling direction of the vehicle and determine, based on the angle, whether the detection target object is to enter a first lane in which the vehicle is traveling from a second lane adjacent to the first lane, as the positional relationship.

According to (3), it can be determined with high accuracy whether another vehicle traveling in the adjacent lane is to enter in front of the vehicle, and the reliability of travel control can be improved.

(4) In the control device described in any one of (1) to (3), the processor is configured to perform the determination when the first angle and the second angle are within a predetermined range.

According to (4), the positional relationship with the detection target object can be determined with higher accuracy.

(5) In the control device described in any one of (1) to (3), the processor is configured to stop the determination when at least one of the one end and the other end is undetectable.

According to (5), the positional relationship with the detection target object can be determined with higher accuracy.

The invention claimed is:

1. A control device that performs travel control on a vehicle, comprising:
a processor configured to obtain output information of an imaging device and a radar device provided in the vehicle, wherein
the processor is configured to:
- detect, based on the output information of the imaging device, one end and an other end in a left-right direction of the vehicle, in a first end of a detection target object around the vehicle, the first end being on a side close to the vehicle in a front-rear direction of the vehicle;
- derive, based on the one end and the other end, a first angle θR formed by a straight line passing through a reference point and extending in the front-rear direction and a straight line connecting the reference point and the one end and a second angle θL formed by the straight line passing through the reference point and extending in the front-rear direction and a straight line connecting the reference point and the other end;
- derive a first distance L1 in the front-rear direction between the first end of the detection target object and the vehicle based on the output information of the radar device;
- determine, according to an expression (A) and an expression (B), a distance YR in the left-right direction between the one end of the detection target object and the vehicle and a distance YL in the left-right direction between the other end of the detection target object and the vehicle as information representing a positional relationship between the vehicle and the detection target object based on the first angle θR, the second angle θL, and the first distance L1:

$$YR = L1 \times \tan \theta R \quad (A)$$

$$YL = L1 \times \tan \theta L \quad (B); \text{ and}$$

- perform travel control on the vehicle based on the determined positional relationship.

2. The control device according to claim 1, wherein the processor is configured to:
- detect, based on the output information of the imaging device, a specific end that is an end on a side close to the vehicle in the left-right direction, in a second end of the detection target object, the second end being on a side far from the vehicle in the front-rear direction, derive a third angle between a direction connecting the vehicle and the specific end and the front-rear direction based on the specific end, derive a second distance between the second end of the detection target object and the vehicle based on the output information of the radar device, and determine the positional relationship based on the first angle, the second angle, the first distance, the third angle, and the second distance.

3. The control device according to claim 2, wherein the processor is configured to determine an angle between a traveling direction of the detection target object and a traveling direction of the vehicle and determine, based on the angle, whether the detection target object is to enter a first lane in which the vehicle is traveling from a second lane adjacent to the first lane, as the positional relationship.

4. The control device according to claim 1, wherein the processor is configured to perform the determination when the first angle and the second angle are within a predetermined range.

5. The control device according to claim 1, wherein the processor is configured to stop the determination when at least one of the one end and the other end is undetectable.

6. The control device according to claim 1, wherein the reference point is on the vehicle.

* * * * *